United States Patent [19]

Murakimi

[11] Patent Number: 5,621,726
[45] Date of Patent: Apr. 15, 1997

[54] POINT-TO-POINT COMMUNICATION NETWORK AND METHOD AND ADAPTER FOR VIRTUALIZING A LAN SYSTEM

[75] Inventor: Kazutaka Murakimi, Pittsburgh, Pa.

[73] Assignee: International Business Machines Corporation, Armonk, N.Y.

[21] Appl. No.: 840,362

[22] Filed: Feb. 24, 1992

[30] Foreign Application Priority Data

May 31, 1991 [JP] Japan ..................... 3-156213

[51] Int. Cl.$^6$ .......................... H04L 12/56; H04L 12/28
[52] U.S. Cl. ...................... 370/60; 370/94.1; 370/94.3; 395/200.12
[58] Field of Search .................. 370/85.1, 85.13, 370/85.14, 60, 82, 94.1, 94.3, 85.5, 110.1; 340/825.5, 825.51; 395/200.01, 200.02

[56] References Cited

U.S. PATENT DOCUMENTS

| | | | |
|---|---|---|---|
| 4,823,338 | 4/1989 | Chan et al. | 370/85.1 |
| 4,926,420 | 5/1990 | Shimizu | 370/94.1 |
| 4,930,123 | 5/1990 | Shimizu | 370/94.1 |
| 5,153,876 | 10/1992 | Sin | 370/85.14 |
| 5,208,811 | 5/1993 | Kashio et al. | 370/94.1 |
| 5,214,646 | 5/1993 | Yacoby | 370/85.14 |

*Primary Examiner*—Benedict V. Safourek
*Assistant Examiner*—Chau T. Nguyen
*Attorney, Agent, or Firm*—Joscelyn G. Cockburn

[57] ABSTRACT

A pseudo or virtual LAN system is formed from point-to-point communications links and dynamic configurable nodes. In each node, commands from upper layer applications are processed in Logical Link Control sub-layer station component to generate LCC data transfer requests, which are in turn converted to Data Link Control Layer data transfer requests in a LAN simulator. DLC data transfer requests are then transferred through point-to-point communication links to other one or more nodes. Asynchronously, with the above processes, a network layer manager maintains the data on the physical formation of nodes participating in the pseudo LAN system according to connection/disconnection between the node concerned and other one or more nodes.

14 Claims, 6 Drawing Sheets

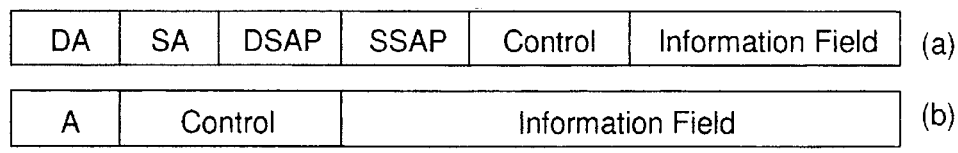

| | | | | | | |
|---|---|---|---|---|---|---|
| DA | SA | DSAP | SSAP | Control | Information Field | (a) |

| | | | |
|---|---|---|---|
| A | Control | Information Field | (b) |

FIG. 4

| NCM No. | MAC Address | Address Type | DLC Type | Index |
|---|---|---|---|---|
| 0 | 4000 0000 0001<br>c000 8000 1000<br>c000 0000 0080<br>ffff ffff ffff | Individual<br>Group<br>Functional<br>Broadcast | | 1<br>2<br>3<br>-1 |
| 1 | 4000 0000 0002<br>c000 8000 1000<br>c000 8000 2000<br>c000 0000 0080<br>ffff ffff ffff | Individual<br>Group<br>Group<br>Functional<br>Broadcast | SDLC | 1<br>2<br>3<br>4<br>-1 |
| 2 | 4000 0000 0003<br>c000 8000 1000<br>c000 0000 0080<br>c000 0010 0000<br>ffff ffff ffff | Individual<br>Group<br>Functional<br>Functional<br>Broadcast | LAPB | 1<br>2<br>3<br>4<br>-1 |
| 3 | 4000 0000 0004<br>c000 8000 2000<br>c000 0000 0080<br>ffff ffff ffff | Individual<br>Group<br>Functional<br>Broadcast | LAPB | 1<br>2<br>3<br>-1 |

FIG. 5

POINT-TO-POINT COMMUNICATION NETWORK AND METHOD AND ADAPTER FOR VIRTUALIZING A LAN SYSTEM

BACKGROUND OF THE INVENTION

1. Field of the Invention

This invention relates to a procedure for building a pseudo LAN (Local Area Network) system by using a plurality of point-to-point communication links in a distributed data process environment. The procedure particularly makes dynamic node configuration possible.

2. Prior Art

Along with recent diffusion of work stations, communication and distribution process among work stations based on a LAN system have widely been used, and various applications based on an interface specified for the standard LAN system are being rearranged. In concert with this, the need for geographical distribution and extension of the location for using a work station has been increased, and various procedures for combining a LAN system with point-to-point communication lines of a wide area network and various procedures for offering a LAN interface on a point-to-point line to form a pseudo LAN system have been developed to remove restrictions on the distance and constituent nodes of the LAN system.

In a point-to-point line, process of a layer-3 (network layer), which does not essentially exists in a LAN system, is necessary. Most existing procedures assume a static network and do not refer to the problem on process of the layer-3 (for example, JA PUPA 63-146536). Some existing procedures attempt to solve the problem by giving a significance to control of the layer-3 in a certain form and by incorporating it into an existing interface (for example, ISDNBIOS employed by the IBM ISDN adaptor employs a procedure for setting and releasing physical links at the same time as setting and releasing data session. ISDNBIOS is described in User's Guide: ISDN Co-Processor Support Program, and ISDNBIOS Interface Description: ISDN Co-Processor Support Program, published by International Business Machines Corporation in U.S. A.) The former, which does not consider that each node may be highly autonomous, is not economical particularly in such an environment that each user has one work station and does not often performs communication. The latter, which adds those beyond the intrinsic process of a LAN system to the LAN interface, imposes restrictions on the use of wide existing LAN applications on a point-to-point line (for example, ISDNBIOS referred to above imposes such a limitation that only one logical data link is permitted to extend to each physical link.)

At present, some systems make remote access to a LAN system possible, such as connection technique among a plurality of remote LAN systems by split bridges based on the LAN bridge defined by IEEE 802.1 and 802.5 committees, and LAN/ISDN interconnection technique being developed by IEEE 802.9 committee. The former, which assumes existence of a LAN system in each site, is not applicable in an environment with no LAN system. With the latter, which is intended principally to hide co-existence of systems by disclosing the LAN network interface to the part of the LAN system and the ISDN network interface to the part of the ISDN system, the use of LAN applications intended by pseudo LAN systems is impossible.

SUMMARY OF THE INVENTION

Most of the existing techniques referred to above do not pay consideration to dynamic modification of network configuration. Even those taking it into consideration have a difficulty in the use of wide existing LAN applications because they employ the procedure of incorporating it into an existing LAN interface.

An object of the invention is to provide a pseudo LAN system available for the way of autonomous use of nodes, which is the intrinsic way of use of the LAN system, by using a plurality of point-to-point communication links. At the same time, the invention aims to use the LAN standard interface in the original form in order to make the use of existing LAN applications possible. In general, a LAN system is virtualized by using dynamic node configuration in point-to-point communication links. A network layer controller 2 for controlling and managing changes in physical configuration of participant nodes in a pseudo LAN system is operated independently of and asynchronously with data link layer controllers 3 and 4 for processing data transfer requested by a LAN application 7. The network layer controller 2 manages and modifies a LAN configuration information table 5, and the data link layer controller 4 uses the LAN configuration information to realize the LAN data transfer request on a point- to-point communication link.

In order to achieve the objects, the invention employs a procedure for realizing a layer-3 controller (network layer controller) for controlling and managing dynamic changes in physical configuration of participant nodes in a LAN system as an asynchronous process independent of a layer-2 controller (data link layer controller) for processing data transfer requested by LAN applications. The layer-2 controller realizes the LAN data transfer request on a point-to-point line on the basis of LAN configuration information maintained and managed by the layer-3 controller in the form of a table.

By realizing layer-3 control absent in the actual LAN system independently of layer-2 control, setting and disconnection of a layer-3 link, which is an express process absent in the LAN system, can be simulated as participation and separation of a node, which is an event independent of the part of the LAN interface, and this operates asynchronously with the layer-2 controller on the part of the LAN interface. Thereby, a group of existing LAN LLC (Logical Link Control) interface functions can be offered faithfully with no restriction imposed. In addition, dynamic configuration of participant nodes is made possible, and any arbitrary pseudo LAN system among arbitrary participants can be built under a wide area network.

BRIEF DESCRIPTION OF THE DRAWINGS

FIG. 4 is a diagram for explaining operation of a LAN simulator 4 in the same embodiment.

FIG. 5 is a diagram for explaining the contents of a pseudo LAN configuration table in the same embodiment.

DETAILED DESCRIPTION OF THE PREFERRED EMBODIMENT

An embodiment of the pseudo LAN system according to the invention is explained below with reference to the drawings.

Figure 1:
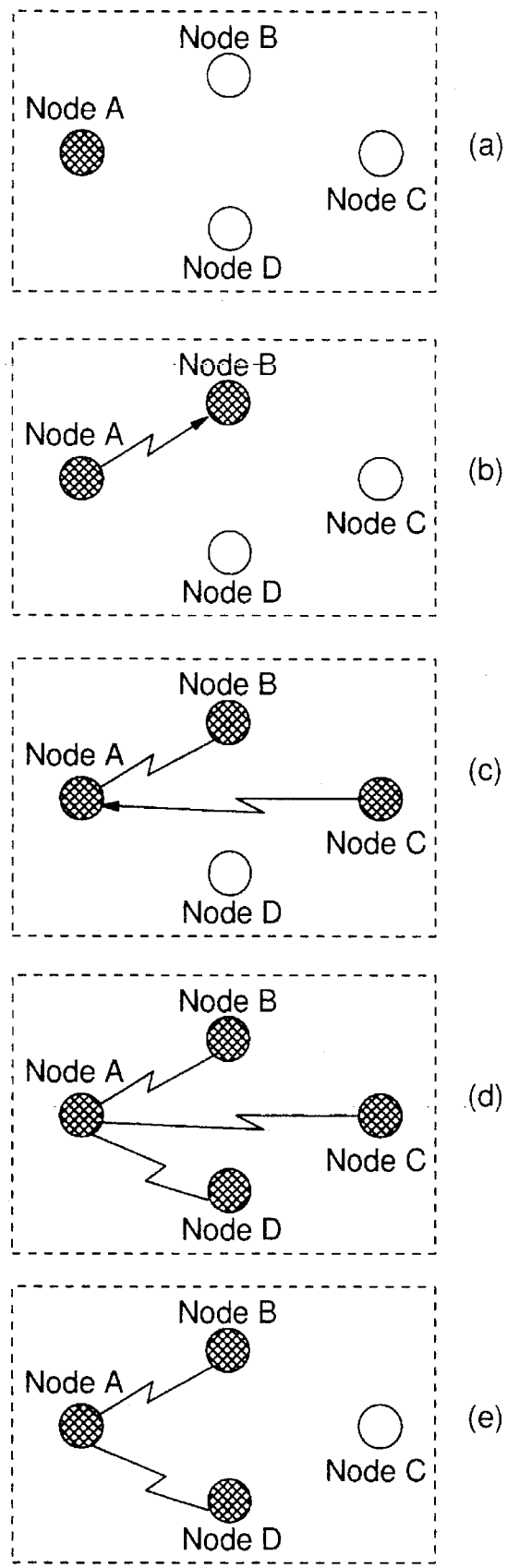
FIG. 1 is a diagram showing an example of changes of a dynamic construction according to an embodiment of the invention.

FIG. 1 shows an example of process in which the pseudo LAN system dynamically changes its configuration. For example, as a scenario causing dynamic configuration like the example of FIG. 1, the way of use under the following distributed work station environment is possible: First, let the work station at a node A be working alone (FIG. 1-a). Then, A extends a layer-3 link (hereafter, a layer-3 link is called a physical link for distinction from a layer-2 link) for cooperative work (for example, cooperative preparation of a document) with the work station at a node B (FIG. 1-b), and begins communication. During this work, let an electronic message be sent from the work station at a node C to A. In this case, the node C extends a physical link to A (FIG. 1-c), and performs data communication. Further, if participation of the work station on a node D is needed for the foregoing cooperative work, a physical link to D is extended to proceed the work (FIG. 1-d). Finally, when message exchange between A and C heretofore processed in parallel is finished, the physical link between A and C is disconnected (FIG. 1-e).

Figure 2:
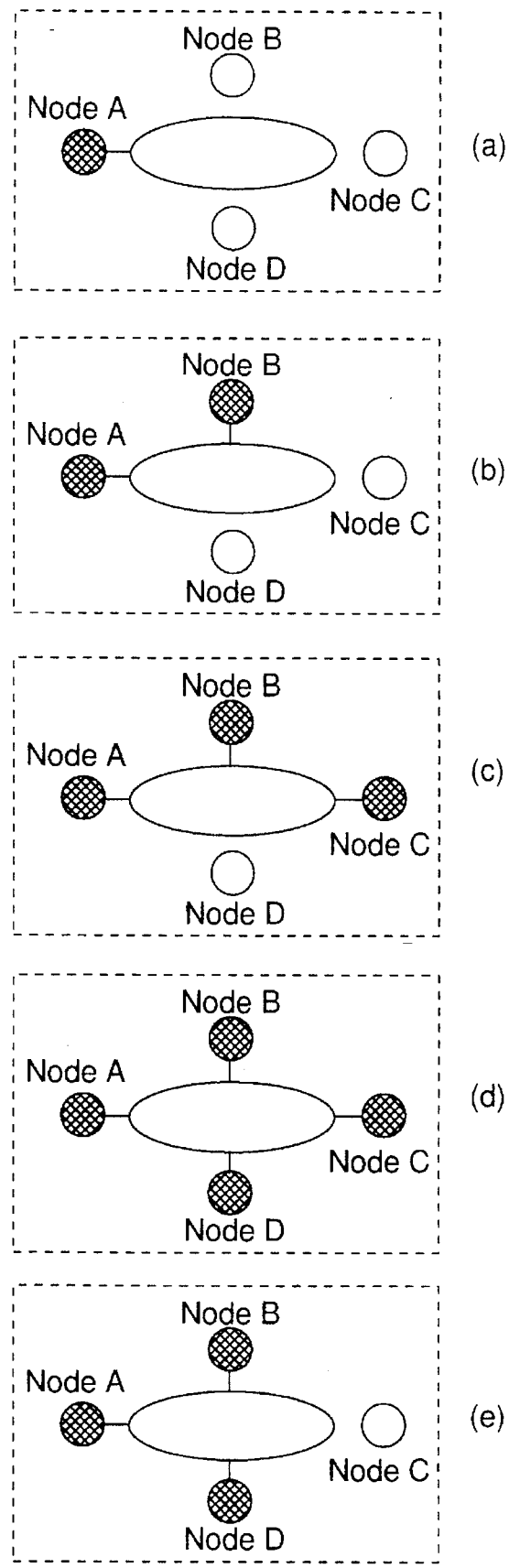
FIG. 2 is a diagram showing the LAN configuration responsive to changes in the construction of FIG. 1.

In order to permit IEEE 802 LAN applications to be workable in the original form, this embodiment employs a procedure for virtually giving to the applications a corresponding LAN service at each point of time during the dynamic configuration process of the foregoing physical links. For example, at each point of FIG. 1, the pseudo LAN system gives a view equivalent to the LAN system shown in FIG. 2 to the LAN application of the node A. Hereinbelow, events to be considered upon giving a pseudo LAN system are first listed up, then, differences between a LAN system and a pseudo LAN system in each event as well as problems for realizing a pseudo LAN system are clarified, and finally, a procedure employed by the embodiment is referred to.

Events causing modification in configuration of a pseudo LAN system are generally classified into the following three cases:

Case 1) a physical link is extended from the self-node . . . FIG. 1-b

Case 2) a physical link extends from another node . . . FIG. 1-c

Case 3) a physical link is disconnected (from the self/another node) . . . FIG. 1-e Case 1 (a physical link is extended from another node) and Case 2 (a physical link is extended from the self-node) correspond to conditions where the other party node starts to work and participates in the LAN system. Each node autonomously participates the LAN system. In case of a pseudo LAN system, however, express process in terms of physical link connection is required. In order to simulate node participation in the LAN system, which is an independent event, it is necessary for a pseudo LAN system to process connection of a physical link as an external event occurring asynchronously.

Case 3 (a physical link is disconnected) means, in a LAN system, separation of the other party node from the LAN system (by power-off, etc.) Each node autonomously separates from the LAN system. In case of a pseudo LAN system, however, express process in terms of disconnection of the physical link is required. In order to simulate the independent event, namely, node separation from the LAN system, it is necessary for the pseudo LAN system to process disconnection of the physical link as an external event occurring asynchronously.

As to data transmitting and receiving process, the following two generally classified cases must be taken into consideration:

Case 4) a physical link is extended . . . FIG. 1-d

Case 5) no physical link is extended . . . FIG. 1-a

Case 4 (a physical link is extended) indicates that it is under normal data transmission/reception. Unlike the LAN system using a shared communication medium, the pseudo LAN system may need selecting a line for actually sending data. In addition, it also needs mapping of an LLC (Logical Link Control) frame of the LAN system to a DLC (Data Link Control) frame of a point-to-point line. Further, it is also necessary to internally process a command in the MAC (Media Access Control) level.

Case 5 is a particular case thereof. Case 5 (no physical link is extended), in the LKN system, corresponds to a condition where the self-node alone is powered on (or participates LAN). In the point-to-point line, since there is a sequential relation between physical link connection and layer-2 communication, layer-2 communication in this status is considered to be an error in physical connection. In contrast, in the LAN system, layer-2 data are sent onto the LAN system. The absence of the other party of communication is detected in an upper layer by a mechanism such as time-out, only when it is necessary. Therefore, even under this status, the pseudo LAN system must accept layer-2 data transmission in the form of simulating operation of the LAN system in FIG. 2-a.

Figure 3:
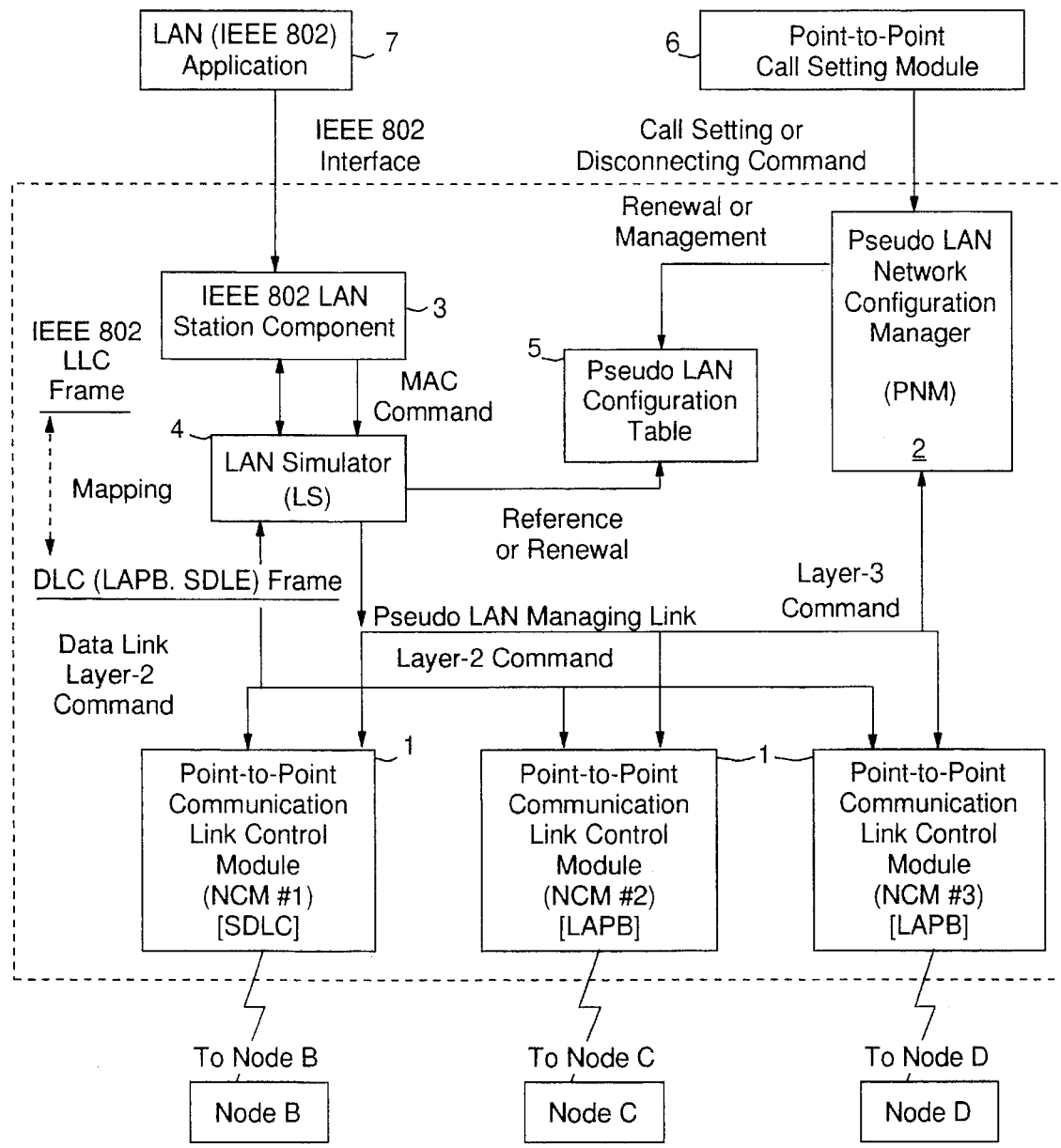
FIG. 3 is a block diagram showing the construction of the same embodiment.

FIG. 3 shows the configuration of each node of the pseudo LAN system. In FIG. 3, those shown in the broken-lined box are a group of modules for realizing the pseudo LAN system. The modules include:

(1) point-to-point communication link control module (NCM) 1

(2) pseudo LAN network configuration manager (PNM) 2

(3) IEEE 802 LAN station component (SC) 3

(4) LAN simulator (LS) 4

(5) pseudo LAN configuration table 5

The point-to-point communication link control module 1 is a device for controlling point-to-point communication links actually connected to this node supporting protocols, such as (network connection control of the layer-3 and DLC control of the layer-2 [SDLC (Synchronous Data Link Control), LAPB (Link Access Procedure Balanced), and so on],). The device is equivalent to various existing point-to-point communication control systems. Each node has one or more communication link control modules 1.

The pseudo LAN network configuration manager 2 utilizes the layer-3 of the communication link control module 1, uniformly controls setting and release of a call, and logically forms a pseudo LAN system. It gives an upper application such as (point-to-point call setting module 6) a command primitive for forming the pseudo LAN system. The command primitive may include functions such as setting and disconnection of a physical link. Operation of the network configuration manager 2 will be described later in greater detail.

The IEEE 802 LAN station component 3 is a software module for realizing the IEEE 802 LAN system, and it is equivalent to the LAN LLC station component of IEEE 802. It gives the IEEE 802 interface to an upper layer application 7 such as APPC (Advanced Program-to-Program Communication), NETBIOS (Network Basic Input/Output System), TCP/IP (Transmission Control Protocol/Internet Protocol), and can move LAN applications, if pursuant to IEEE 802, without modification. The station component 3 builds a LAN LLC frame, and delivers it to the LAN simulator 4. LAN MAC addresses are assigned in accordance with the station component 3.

The major work of the LAN simulator 4 is to generate a point-to-point communication link data unit corresponding to the LAN LLC frame delivered from the station component 3 on the basis of the current configuration of the pseudo LAN system, then convert it into a DLC frame of the link (such as LAPB frame, etc.), and deliver it to the communication link control module 1. In addition, the DLC frame having reached the communication link control module 1 is converted into the LAN LLC frame, and it is delivered to the station component 3. This operation will be described later in greater detail. The LAN simulator 4 also adds and deletes the self-node MAC address (described later), and interprets and processes MAC commands such as request for initializing LAN hardware. In response to the request for initializing LAN hardware, process for initializing the interior status of the LAN simulator 4 and the self-node address is performed.

FIG. 4 shows LLC frame arrangement of a typical LAN system and DLC frame arrangement of a point-to-point communication link.

The LAN LLC frame (FIG. 4-a) includes a destination address field (DA), and a sender address field (SA). They are used to distinguish a pair of communication nodes (destination and sender nodes) among a plurality of nodes on the LAN system. Further, it is configured to designate SAPs (Service Access Points) on the nodes by using DSAP and SSAP fields. Then, transmission of the LLC frame between SAPs on the pair of nodes becomes possible. For DA and SA, a LAN MAC address assigned to each station component 3 is used. For this MAC address, in addition to an individual MAC address which can definitely identify the LAN node, a group MAC address, a functional MAC address, a broadcast MAC address may be designated. In each node, MAC commands for setting these addresses of the self-node in a quasi-software approach is given. In contrast, in the DLC frame of the point-to-point communication link (FIG. 4-b), since the other party node of communication is determined physically and definitely, DA and SA fields do not exist. Neither SAP field exists, unlike the LAN system. Instead, one address field (A) is given, and it is used to realize multiplexing of logical links on a single physical link. This embodiment also uses this address field to multiplex the layer-2 link for normal data and the layer-2 link for pseudo LAN managing data. In the transmitter, the DLC frame mapped from the LAN LLC frame by the LAN simulator 4 are delivered to the data link, and managing data from a network configuration manager and managing data from the LAN simulator 4 at the time of occurrence of MAC commands for self-node address conversion (described later) are delivered to the pseudo LAN managing link. In the receiver, data from the data link are delivered to the LAN simulator 4, and data from the pseudo LAN managing link is delivered to the network configuration manager 2.

Information on the current configuration of the pseudo LAN system used by the LAN simulator 4 is stored in the pseudo LAN configuration table 5 (FIG. 5). Each entry of the table contains an NCM number, a MAC address defined on the node, a type of MAC address, a kind of DLC used in each physical link, and an address index number. The entry having NCM number 0 contains self-node address information while the others contain address information on nodes connected through associated communication link control modules. The entry of a communication link control module with no physical link extended is empty. The address index number is used to identify MAC addresses when a plurality of MAC addresses (one individual MAC address plus a plurality of groups or functional MAC addresses) are defined in the other party node. A fixed address index number (for example, −1) is assigned to the broadcast address.

Figure 6:
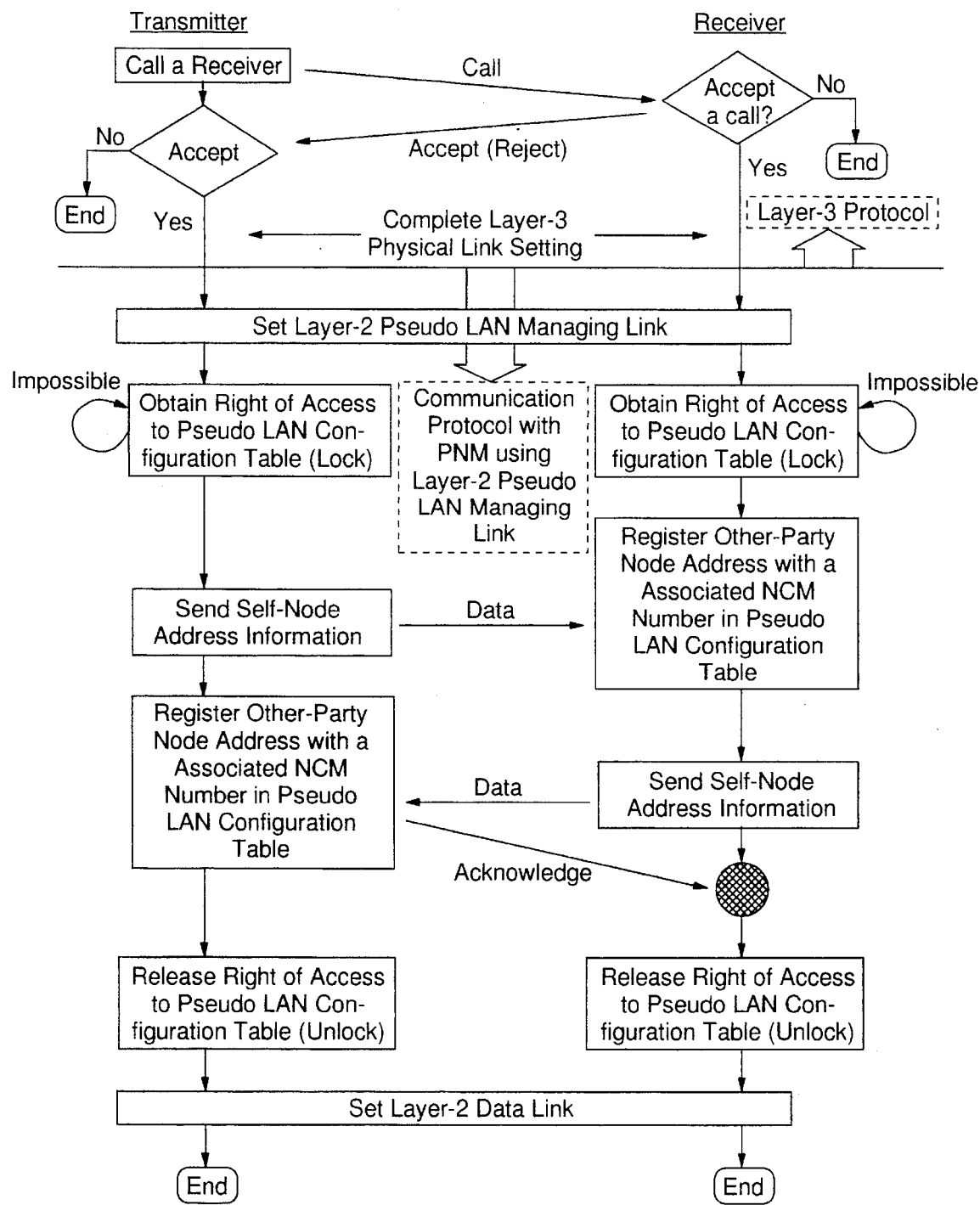
FIG. 6 is a flow chart that explains operation of a pseudo LAN network configuration manager 2 in the same embodiment.

Address information on the other part node as well as connection and disconnection of a call is renewed and managed by the network configuration manager 2. FIG. 6 shows an example of operation of the network configuration manager 2 upon connection of a call (case 1 (transmitter) and case 2 (receiver)). When setting of a physical link by the layer-3 protocol is finished, the network configuration manager 2 extends a link for using the pseudo LAN system of the layer-2 on the associated communication link control module 1. The link is used by both parts to send addresses registered in their self-nodes between them. The network configuration manager 2 on the part of the receiver registers the other party node address in the entry having the associated NCM number in the pseudo LAN configuration table 5. As shown in the figure, before and after exchange of the table information, lock and unlock of exclusive access right of the table are effected. This prevents occurrence inconsistency of information by renewal of the self-node information (described later). In addition, at the stage of the call setting process, the layer-2 data link is also extended for preparation of data transfer process with the LAN simulator 4.

Figure 7:
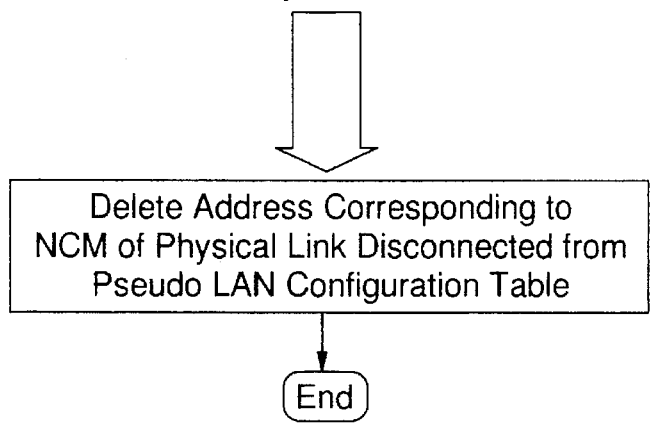
FIG. 7 is a flow chart that explains operation of the pseudo network configuration manager in the same embodiment.

FIG. 7 shows operation of the network configuration manager 2 upon disconnection of a call (Case 3). After completion of the layer-3 protocol for disconnection of the physical link, the network configuration manager 2 deletes all entries related to the communication link control module 1 associated with the physical link disconnected from the pseudo LAN configuration table 5.

Figure 8:
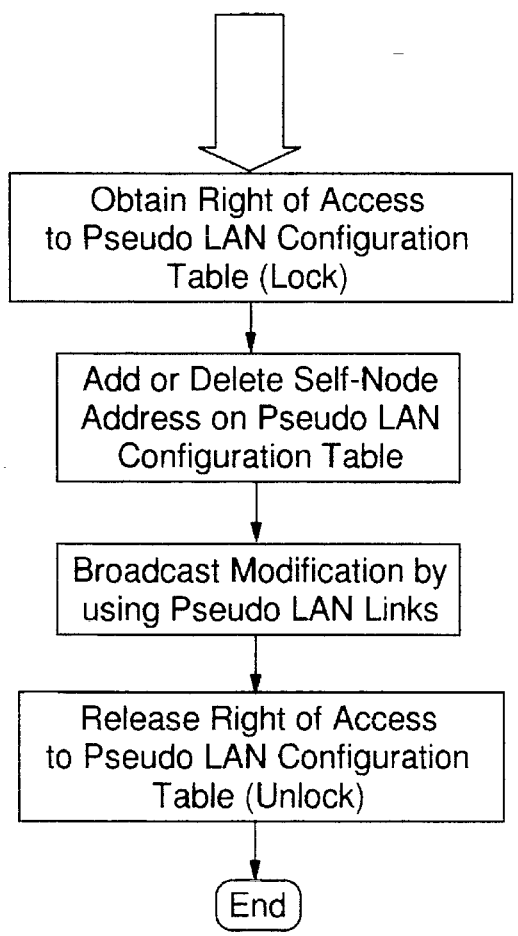
FIG. 8 is a flow chart that explains operation of the pseudo LAN network configuration manager 2 in the same embodiment.

The self-node address information is set upon the start-up of the system with respect to a default address. The others, namely, addition and deletion of self-node addresses by MAC commands, passing through the station component 3, are accepted by the LAN simulator 4. This operation is shown in FIG. 8. Here again, lock and unlock of the exclusive right for access to the table are performed before and after the process. The added or deleted entry is notified to all the currently connected other party nodes by using the pseudo LAN managing links. The receiver (network configuration manager 2) renews the pseudo LAN configuration table 5 on the basis of the notice.

For the data transmitting and receiving process in the LAN simulator 4 (selection of a destination physical link and frame mapping between the LAN LLC frame and the DLC frame of a point-to-point line), pseudo LAN configuration information prepared as explained above is used. This process is performed on the basis of information at the time of the data transmission and reception, and can be realized asynchronously with modification of the configuration information. The procedure of the data transmission and reception is shown below. Note that the data are discriminated from the pseudo LAN managing data on the point-to- point line by using multiplexing by the address field (A).

1. The transmitter LAN simulator 4 refers to the pseudo LAN configuration table 5 and searches for a communication control module 1 having a MAC address corresponding to the DA field of the LAN LLC frame.

2. If it can find it, it excludes DA and SA fields and sends the data to the data link of the communication link control module 1. DSAP, SSAP, and the control field are sent as part of the information frame. At the same time, information on the address index number corresponding to the received MAC address is also included in the information field.
3. In case of transmission to a group address and a functional address, procedures 1 and 2 are repeatedly executed for all of corresponding communication link control modules 1. In broadcast, all of communication link control modules 1 are selected.
4. If the address is not found in procedure 1, the frame is abandoned.
5. The layer-2 link data alone are delivered to the LAN simulator 4 by the receiver communication link control module 1 on the part of the receiver (managing data are delivered to the network configuration manager 2 as described above.)
6. The receiver's LAN simulator 4 builds the LLC frame from the DLC frame by using the pseudo LAN configuration table 5 as follows: The SA field restores the individual MAC address under the received NCM number by using the pseudo LAN configuration table 5, while the DA field restores the self-node MAC address corresponding to the address index number sent via the information field, by using the table 5. DSAP, SSAP, and control information fields are extracted and set from the information field of the DLC frame.

Heretofore, the mechanism of transmission and reception under the situation with a physical link extended (Case 4) was described; however, this is available, as it is, also under the situation with no physical link extended (Case 5). That is, because the associated link control module 1 is not found in procedure 1, the process automatically progresses to step 4, and abandons the frame.

This invention is not limited to the embodiment described above, but involves various modifications to an extent without departing from the scope thereof. For example, the described embodiment referred only to a pseudo LAN system; however, it is possible to couple the pseudo LAN system and the actual LAN system by a bridge method.

Primary effects obtained by the invention are:

dynamic configuration of an arbitrary LAN system among arbitrary participants extension of the LAN system to a remote system.

Some of further effects are:

effective use of existing LAN applications improvement of efficiency in software development by the shared use of applications.

By the use of the supporting point-to-point communication links, restriction on distance for remote connection involved in existing LAN systems is of course removed. Moreover, even in the environment with no LAN system, for example, in the use of a portable machine, the system according to the invention has such a merit that any arbitrary LAN system can dynamically be formed among arbitrary participants, and it is superior in this respect to the remote LAN bridge which can remove restriction on distance. Further, formation of a dynamic pseudo LAN system has a merit from the economical viewpoint in a distributed work station environment in which each user has one work station but does not often use it for communication.

One of reasons why this procedure has not been proposed may be the problem of high cost and low speed of remote communication links. From the opposite viewpoint, it can be said that the existence of this problem has led to diffusion of LAN systems that can overcome the problem. At present, the aforementioned problem has not yet been overcome, and a difference from local systems remains. However, considering recent progress of optical fibers and development of ATM (Asynchronous Transfer Mode) and wide-band ISDN, the difference between local and remote systems in terms of communication hardware is considered to be removed in a near future.

On the other hand, its development in terms of software appears to be much slower. From this viewpoint, the use of abundant existing LAN applications must be a very effective approach. However, network configurations of remote communication links are different from LAN configurations, and supported communication interfaces are also different. Therefore, even if a high-speed remote communication link appears in the future, it is difficult to use existing applications which require a relatively high-speed communication medium, such as distributed process applications which are the target of current extensive studies on the basis of the LAN system. Introduction of a pseudo LAN system which faithfully reproduces characteristics of a LAN system and offers absolutely the same interface, as proposed by the invention, can be the key for obtaining the aforementioned merit. Further, also from the viewpoint of the shared use of applications, the system of the invention is expected to significantly improve the developing efficiency of software.

Having thus described our invention, what we claim as new, and desire to secure by Letters Patent, is:

1. A method for establishing a pseudo LAN system in a point-to-point communication network, wherein nodes are being connected through point-to-point communication links, comprising the steps of:

generating logical link control sub-layer data unit from an upper layer command;

establishing and controlling said point-to-point communication links to form the pseudo LAN system;

storing configuration information on the pseudo LAN system;

modifying said configuration information based on connection and disconnection of said point-to-point communication links;

in response to said modified configuration information, converting said logical link control sub-layer data unit to a point-to-point communication link data unit and transferring it through said point-to-point communication links; and converting said point-to-point communication link data unit received through said point-to-point communication links to said logical link control sub-layer data unit.

2. A method for establishing a pseudo LAN system in a point-to-point communication network, wherein nodes are being connected through point-to-point communication links, comprising the steps of:

connecting a point-to-point communication link between a specific node and another node;

in response to the connection of said point-to-point communication link, modifying configuration information on the pseudo LAN system;

generating a logical link control sub-layer data unit from an upper layer command;

in response to modified configuration information converting said logical link control sub-layer data unit to a point-to-point communication link data unit to be transferred through said point-to-point communication link;

converting said point-to-point communication link data unit received through said point-to-point communication link to said logical link control sub-layer data unit;

in response to a disconnection of said point-to-point communication link, modifying said configuration information.

3. The method for establishing a Pseudo LAN system in a point-to-point communication network according to claim 2 wherein data for modifying said configuration information are transferred through said point-to-point communication link together with data to be converted to said logical link control sub-layer unit.

4. The method for establishing a pseudo LAN system in a point-to-point communication network according to claim 3 wherein said point-to-point communication link data unit includes a field indicating whether it is data for modifying said configuration information or data to be converted to said logical link control sub-layer data unit.

5. An adaptor for establishing a pseudo LAN system in a point-to-point communication network, wherein a plurality of nodes are connected by point-to-point communication links, comprising:

logical link control sub-lay process means (3) for generating logical link control sub-layer data unit from an upper layer command;

memory for storing configuration information on the pseudo LAN system;

means for connecting/disconnecting point-to-point communications link among nodes and modifying said configuration information based on connection and disconnection of said point-to-point communication links, coupled to said means for storing configuration information;

means responsive to modified configuration information for converting said logical link control sub-layer data unit received from said logical link control sub-layer process means, to a point-to-point communication link data unit to be transferred on one of the point-to-point communication links;

means, coupled to the memory for storing configuration information, responsive to said modified configuration information for converting a point-to-point communication link data unit received from one of said point-to-point communication links to a logical link control sublayer data unit; and link control modules for receiving the point-to-point communication link data and for controlling said point-to-point communication links.

6. A virtual Local Area Network LAN system comprising:

at least three reconfigurable nodes; and at least two point-to-point communications links interconnecting the at least three reconfigurable nodes;

with each one of said at least three reconfigurable nodes having a storage means for storing configuration information for the virtual LAN;

first means responsive to CALL setting or Disconnecting Command, for connecting/disconnecting point-to-point communications links between the at least three reconfigurable nodes and modifying configuration information based upon connection and disconnection of said point-to-point communications links, operatively coupled to the storage means;

second means for providing a predetermined LAN interface to be used by application programs and for building a first frame in accordance with a first frame format;

LAN simulator means responsive to said configuration information for converting said first frame with the first frame format to a second frame with a second frame format; and communications link control module for receiving the second frame, delivering said second frame to selected ones of said at least two point-to-point communications links and controlling selected ones of said at least two point-to-point communications link.

7. The virtual LAN system of claim 6 wherein the predetermined LAN interface includes one for realizing the IEEE 802 to LAN system.

8. The virtual LAN system of claim 7 wherein the first frame includes an IEEE 802 LLC frame.

9. The virtual LAN system of claim 8 wherein the second frame includes a DLC frame.

10. The virtual LAN system of claim 6 further including program means for providing applications coupled to the predetermined LAN interface.

11. The virtual LAN system of claim 10 includes IEEE 802 LAN applications.

12. The virtual LAN system of claim 6 further including point-to-point call setting module for issuing call setting or disconnecting commands coupled to the first means.

13. A node for using in a virtual LAN system formed from point-to-point communications links, said node comprising:

a storage means for storing configuration information for the virtual LAN system;

first means, responsible to a CALL setting or Disconnecting Command, for connecting/disconnecting the point-to-point communications links connected to the node and modifying configuration information based upon connections and disconnections of said point-to-point communications links, operatively coupled to the storage means;

second means for providing a predetermined LAN interface to be used by application programs and for building a first frame in accordance with a first frame format;

LAN simulator means, coupled to the second means, responsive to said configuration information for converting said first frame with the first frame format to a second frame with a second frame format; and communications link control module responsive to control signals from the first means, for receiving the second frame, delivering said second frame to the point-to-point communications links and controlling said point-to-point communications link.

14. In a distributed network comprising a plurality of nodes interconnected by a plurality of point-to-point communication links, a computer program product for establishing a pseudo LAN system when executed by a computer in selected ones of the plurality of nodes said computer program product comprising:

a computer readable medium;

a computer readable program means for causing the computer to generate logical link control sub-layer data unit from an upper layer command, a computer readable program means for causing the computer to establish and control point-to-point communication links to form the pseudo LAN system interconnecting the nodes;

a computer readable program means for causing the computer to store in a memory configuration information on the pseudo LAN system;

a computer readable program means for causing the computer to modify said configuration information based on connection and disconnection of said point-to-point communication links;

a computer readable program means for causing the computer to convert said logical link control sub-layer data unit to said point-to-point communication link data unit and transferring it through said point-to-point communication links; and a computer readable program means for causing the computer to convert said point-to-point communication link data unit received through said point-to-point communication links to said logical link control sublayer data unit.

\* \* \* \* \*